United States Patent [19]

Piepenbreier

[11] Patent Number: 4,664,037

[45] Date of Patent: May 12, 1987

[54] UNIVERSAL DOUBLE COUPLING

[75] Inventor: Ernst Piepenbreier, Essen, Fed. Rep. of Germany

[73] Assignee: Thyssen Industrie AG, Fed. Rep. of Germany

[21] Appl. No.: 696,752

[22] Filed: Jan. 31, 1985

[30] Foreign Application Priority Data

Feb. 4, 1984 [DE] Fed. Rep. of Germany ....... 3403910

[51] Int. Cl.[4] .......................... B61C 9/44; F16D 3/68
[52] U.S. Cl. .................................. 105/131; 464/76; 464/96
[58] Field of Search ................. 105/117, 131; 464/73, 464/76, 91, 96

[56] References Cited

U.S. PATENT DOCUMENTS

| 2,146,765 | 2/1939 | Ricefield | 464/73 |
| 2,973,633 | 3/1961 | Hall | 464/96 X |
| 3,859,929 | 1/1975 | Korn et al. | 105/131 |
| 4,050,266 | 9/1977 | Bergman | 464/76 |
| 4,135,453 | 1/1979 | Koch et al. | 105/131 |

FOREIGN PATENT DOCUMENTS

| 105400 | 1/1927 | Austria | 105/131 |
| 2353256 | 5/1975 | Fed. Rep. of Germany | 105/131 |

Primary Examiner—Randolph A. Reese
Attorney, Agent, or Firm—McGlew and Tuttle

[57] ABSTRACT

A double coupling comprising two flexible couplings are connected to each other through an intermediate hollow shaft and have outer parts on each and each with a hub and radially extending arms between which rubber blocks shaped as ring segments are inserted in a prestressed state. The rubber blocks each comprise a central, radially inwardly narrowing wedge to which two rubber members carrying plates on their free surfaces are symmetrically vulcanized on either side. The wedges are connected to corresponding claws of the intermediate shaft. The wedge and claws, along with the intermediate shaft serves as a common hub portion and form an inner part of the flexible coupling. One hub is secured to a solid shaft and the other hub is secured to a hollow shaft. The solid shaft extends through the hollow shaft and they move relative to each other, even in misaligned positions. As compared to similar prior art couplings for transmitting comparable power, the weight of such a doubling coupling is reduced.

9 Claims, 6 Drawing Figures

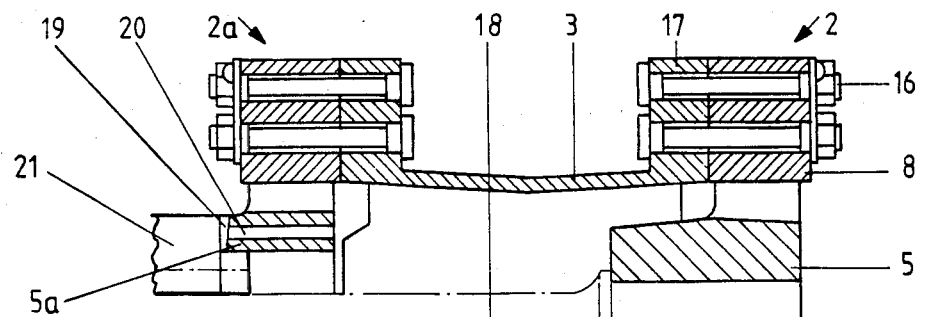
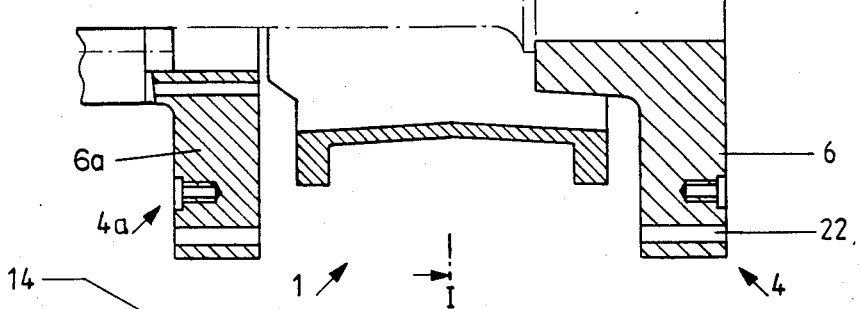
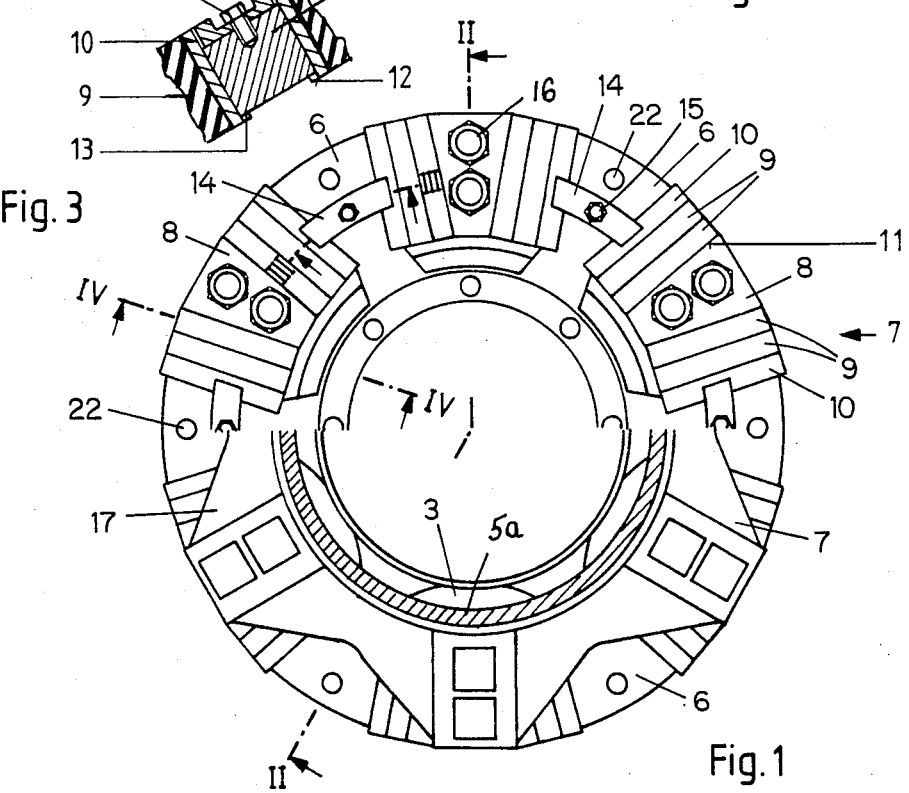

UNIVERSAL DOUBLE COUPLING

FIELD AND BACKGROUND OF THE INVENTION

This invention relates in general to rail car construction and in particular to a new and useful universal coupling for rail car trucks.

A similar coupling is disclosed in German OS 23 53 256 (FIG. 2). In this prior art coupling, universal mobility is obtained by providing between the outer parts of the coupling two planar coupling zones, one after the other. Each coupling zone is formed by individual rubber stacks which are uniformly distributed over the circumference. The rubber stacks are mounted in positions to make a hub spider of the outer part interengaged in the individual joint planes with a spider having an equal number of arms and being provided on the respective end of the intermediate shaft. Gaps are thereby formed into which the individual rubber stacks are inserted in a prestressed state. Prestressing, position, and spring rate of the rubber stacks are brought into such relation that in an assembled state, the sum of all acting forces is zero. No residual circumferential force remains which could put the system out of balance. The dimensioning of this prior art double coupling not only depends on the properties of the individual stacks having to satisfy simultaneously requirements of torsional resilience and restoring force, but also the loadability of the spider arms. Due to the involved geometry, cast material of relatively high quality, such as cast steel, must be employed. This makes the coupling relatively heavy.

SUMMARY OF THE INVENTION

The invention is directed to a coupling of the abovementioned kind which, however, is less heavy and at the same time is simple in manufacture.

In accordance with the invention a universally acting double coupling for a vehicle such as a rail truck for interconnecting a drive to a rotatable output shaft from a power source which is connected to a rotatable hollow shaft positionable over the rotatable output shaft includes a first hub connected to the output shaft with a plurality of angularly spaced and radially extending first arms extending outwardly of and connected to the first hub. A coupling shaft over the output shaft is located between the first arms and the hollow shaft and has a first end connected to the first arms and has an opposite end. A second hub portion is connected to the rotatable hollow shaft and it has a plurality of angularly spaced and radially extending second arms extending outwardly of and connected to the second hub. The connections of the first and second arms through the coupling shaft include a ring shaped assembly including a plate closing each of the arms circumferentially and a prestressed rubber block vulcanized to the plates which include two rubber members having mirror symmetrical sides and a ring shaped wedge which has a narrow apex facing the center of the associated hub which fixes the rubber members by vulcanization and is detachably connected to the coupling shaft adjacent its other end.

A single rubber block with two separately effective rubber members is now provided as the elastomeric unit for both directions of torsion. The prior art has provided two individual stacks for this purpose. The invention preserves the total rubber volume and also keeps to the necessary vulcanization faces, as in the prior art. Only, the two adjacent rubber members of the elastomeric unit are now vulcanized by their inside surfaces directly to a metal wedge, to form the rubber block. The plates vulcanized to the outside of the rubber block have been maintained. Since according to the invention, the inner plates of the prior art are absent, the unit becomes shorter by the thickness of two plates in the circumferential direction. The rubber blocks may therefore be displaced farther to the inside and the diameter of the double coupling can be reduced while obtaining the same strength of the parts as in the prior art. This reduces the weight of the coupling. On the other hand, since the wedges belong to the inner part of the double coupling, yet are separated therefrom due to the detachable securing with bolts, the intermediate shaft, having no arms to engage between rubber stacks, can be manufactured as a plain turned part. This reduces manufacturing costs.

Since the two inner vulcanized plates are omitted, the arms may be made thicker, as compared to the prior art design; therefore, light metal may be employed. While maintaining the safety factors, this may save from 40 to 60% of the weight.

Advantageously, the plates extend parallel to the vulcanization faces of the wedges, to obtain equally thick rubber members. However, the plates may also extend in a plane passing through the axis of the coupling, so that, considered in the axial direction, the rubber members also will be wedge shaped and the load will be distributed differently. In both instances, however, the two vulcanized outer plates extend wedge like relative to each other, so that the rubber blocks can be inserted to about half or ⅔rds of their radial height, until they slightly apply. A mounting fixture exerting a radial pressure on the rubber blocks facilitates the final assemblage. Also, the rubber blocks themselves may advantageously be wedge-shaped, considered in a section through the axis of the coupling.

To further facilitate the assemblage, the plates may be provided with bent border flanges engaging the arms. Advantageously, two and two of the adjacent rubber blocks are radially held in position by arresting edges applying against the arms, and by a screw extending through the arresting wedge into the arm.

It has proved particularly advantageous to use the inventive double coupling for connecting an axle supported in a truck or frame of an axle drive rail vehicle, to a hollow outer shaft surrounding the axle with play, of a transmission which is flanged frontally to an electric motor extending in the travel direction and secured along therewith to the truck or frame.

Accordingly, it is an object of the invention to provide an improved universally acting double coupling.

A further object of the invention is to provide a universally acting double coupling particularly for rail trucks which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial sectional and elevational view taken along the lines I—I of FIG. 2, of a double coupling;

FIG. 2 is a section taken along the line II—II of FIG. 1;

FIG. 3 is a section taken along the line III—III of FIG. 1;

DESCRIPTION OF THE PREFERRED EMBODIMENTS

Figures 4, 5:
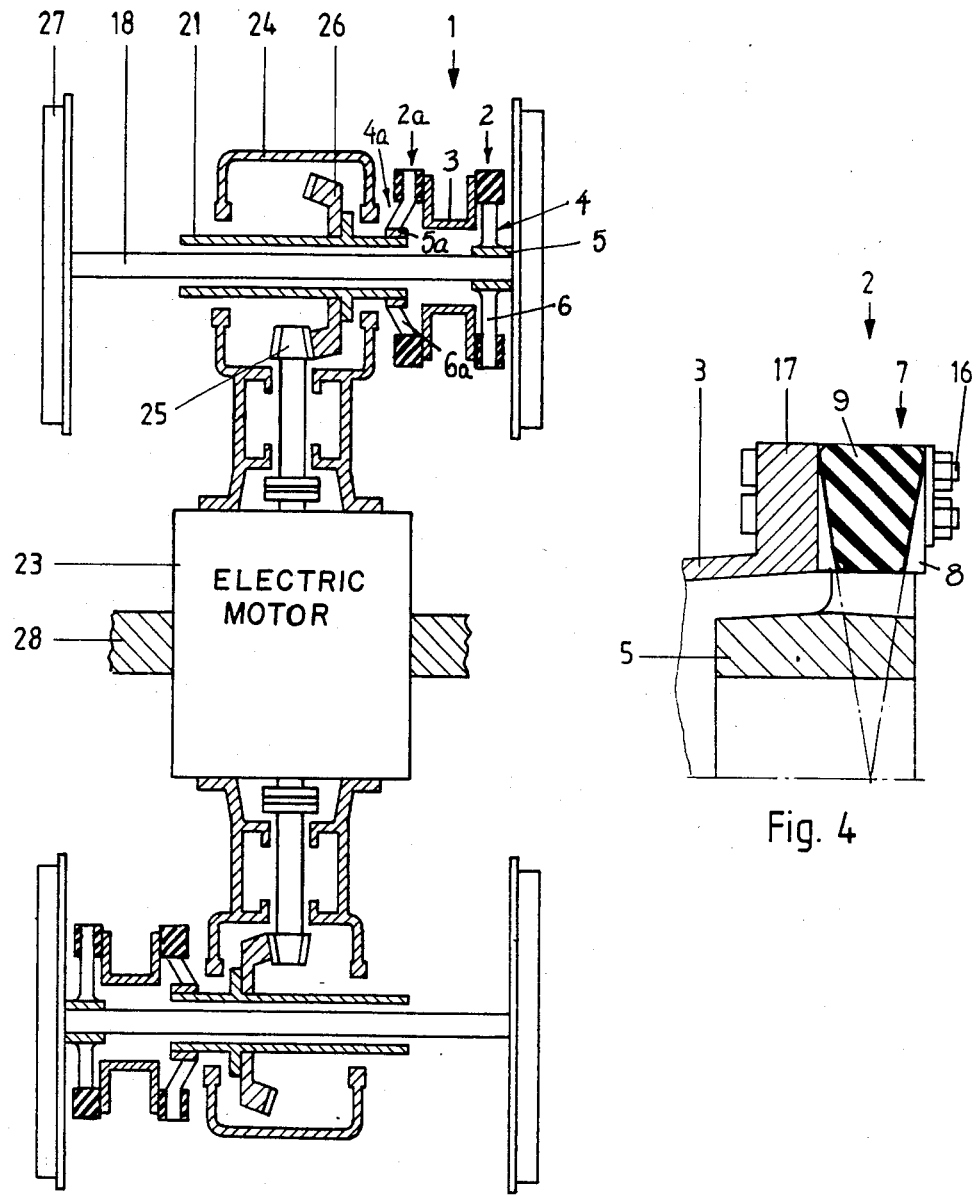
FIG. 4 is a section taken along the line IV—IV of FIG. 1.
FIG. 5 is a partly sectional top plan view of a double axle drive.

Referring to the drawings in particular the invention embodied therein comprises a universally acting doubling coupling generally designated 1 for a vehicle such as a rail truck shown in FIG. 5. The coupling is provided for connecting the drive of the truck, such as an electric motor 23 driving through a bevel gear 25 and a pinion 26, connected to a rotatable hollow shaft 21. The hollow shaft 21 is positionable over a rotatable output shaft 18 and the coupling generally designated 1 is connectable between the solid shaft 18 and the hollow shaft 21.

The universal double coupling generally designated 1 permits angular as well as parallel misalignment of the two connected shafts. According to FIGS. 1 and 2, double coupling 1 comprises two individual flexible couplings 2, 2a which are connected to each other through a sleeve-like intermediate shaft 3. Each of couplings 2, 2a comprises an outer part 4,4a including a hub 5,5a wherefrom a plurality of arms 6,6a extend radially outwardly at different angles. Between arms 6 presstressed rubber blocks 7 are inserted along a circle. The rubber blocks 7 have the shape of ring segments and they are built up of a central wedge 8 whose narrow end faces the axis of the coupling, rubber members 9 vulcanized thereto symmetrically on both sides, and plates 10 which are vulcanized in symmetrical arrangement to the free end faces of the rubber members.

Figure 6:
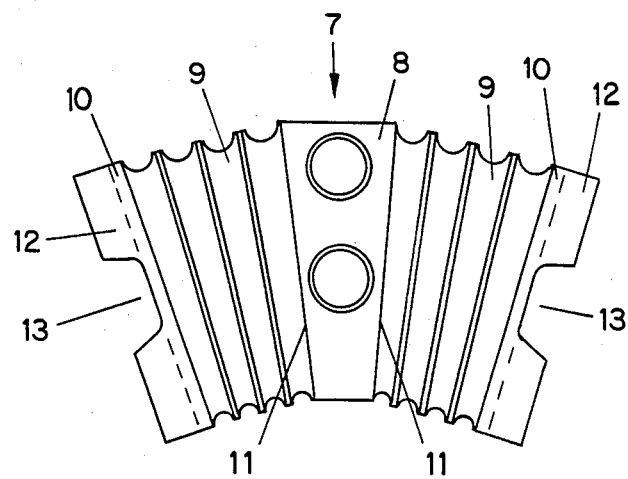
FIG. 6 is an enlarged elevational view of other rubber blocks that can be used in the double coupling of FIG. 1.

While all the vulcanization faces 11 of wedges 8 and plates 10 extend in planes which are parallel to the coupling axis, plates 10 extend according to FIG. 1 parallel to vulcanization faces 11 so that the thicknesses of rubber members 9 stay equal along the full radial extent of each rubber member. The planes of both vulcanization faces 11 and plates 10 may interesect, however, at the coupling axis, so that even the rubber members 9 become wedge-shaped as shown in FIG. 6. This changes the load distribution within the rubber. In such an instance, rubber blocks 7 may be made wedge-shaped even in the radial section according to FIG. 4, so that their symmetrical wedge flanks intersect at the coupling axis.

According to FIG. 3 and FIG. 6, each plate 10 has at least one bent border flange 12 laterally engaging the arm 6 to which it applies and being provided with a recess 13. These recesses are engaged by an arresting wedge 14 secured to the side faces by means of a screw 15 extending into arm 6. Rubber blocks 7 are thereby held in place on arms 6 radially. Each wedge 8 is connected in the radially outer zone of the coupling to corresponding claws 17 of intermediate shaft 3 by means of two bolts 16, in a manner such that a frictional grip is produced between the parts connected to each other. The inner parts of couplings 2, 2a are thus formed, which are united with each other by intermediate shaft 3 serving as a common hub, as mentioned above.

While the hub 5 of one of the flexible couplings is carried on the solid shaft 18, hub 5a of the other flexible coupling is connected to the hollow shaft 21, through front teeth 19 and bolts which are passed through holes 20. Within limits given by the construction, shaft 21 and shaft 18 extending therethrough can cardanically move relative to each other, or even rotate in axial misalignment. Above screws 15, in arms 6, holes 22 are provided in which an assemblage fixture (not shown) may be secured. By means of such a fixture, plate 10 and wedge 8 of an individual rubber block 7 are simultaneously pushed radially inwardly until the two bolts 16 can be passed through wedge 8 and the two plates 10 are under sufficient squeeze to produce the necessary precompression and insert and screw in place arresting wedges 14 Wedge 8 and plates 10 may be made of light metal alloy.

FIG. 5 shows the use of the inventive coupling in a double axle drive for rail vehicles. To each of the front sides of an electric motor 23 extending in the travel direction, an angular gearing 24 is flanged by which, through bevel gears 25 and 26, hollow shafts 21 are driven which surround with clearance the shaft 18 of track wheels 27. Electric motor 23 and angular gearings 24 are connected to the truck frame through a resilient suspension 28. Each of hollow shafts 21 is connected by one end through the double coupling 1 to its shaft 18, as described above.

While specific embodiments of the invention have been shown and described in detail to illustrate the application of the principles of the invention, it will be understood that the invention may be embodied otherwise without departing from such principles.

What is claimed is:

1. A universally acting double coupling for coupling a hollow shaft to a second shaft extending through the hollow shaft, the hollow shaft and second shaft being part of a drive connection in a vehicle, comprising a sleeve-like intermediate shaft extending around a portion of the second shaft, said intermediate shaft having one end adjacent the hollow shaft and an opposite end, a first hub fixed to the second shaft and having a plurality of circumferentially spaced radially extending arms extending outwardly therefrom adjacent said opposite end of said intermediate shaft, a second hub fixed to the hollow shaft and including a plurality of circumferentially spaced radially extending arms extending outwardly therefrom and adjacent said one end of said intermediate shaft, a first plurality of wedges detachably fixed to said opposite end of said intermediate shaft, each wedge of said first plurality of wedges being positioned between two adjacent arms of said first hub, a second plurality of wedges detachably connected to said one end of said intermediate shaft, each wedge of said second plurality of wedges being positioned between two adjacent arms of said second hub, said first and second plurality of wedges each being circumferentially spaced around said intermediate shaft, a pair of rubber members each having inner facing surfaces vulcanized to respective sides of one wedge of each of said first and second plurality of wedges, each pair of rubber members being mirror symmetrical about a plane extending radially through a center of each wedge, said plane being parallel to the axis of said double coupling, said opposite sides of each wedge being inclined toward each other toward the axis of said double coupling, each rubber member of each pair of rubber members having an outer surface, a plate vulcanized to each outer surface of each rubber member, and means for connecting said plates to said arms of said first and second hubs with each pair of rubber members with its wedge and plates being in the form of a circumferential segment and being disposed between adjacent arms of said first and second hubs.

2. A double coupling according to claim 1, wherein said plates and said wedges are all made of light metal alloy.

3. A double coupling according to claim 1, wherein said inner surfaces of said rubber members each extend parallel to said outer surfaces thereof so that faces of said wedges extend parallel to adjacent plates.

4. A double coupling according to claim 3, wherein said plates and wedges are made of light metal alloy.

5. A double coupling according to claim 1, wherein said inner and outer surfaces of each rubber member lie in planes which intersect with the axis of said double coupling.

6. A double coupling according to claim 5, wherein said plates and wedges are made of light metal alloy.

7. A double coupling according to claim 1, wherein each rubber member has first and second surfaces facing in opposite axial directions and which extend between said inner and outer surfaces thereof, said first and second surfaces being inclined inwardly toward each other and in a direction toward the axis of said double coupling so that each rubber member is wedge-shaped.

8. A double coupling according to claim 7, wherein said first and second surfaces lie in planes which intersect with the axis of said double coupling.

9. A double coupling according to claim 8, wherein said inner and outer surfaces of each rubber member lie in planes which extend parallel to each other.

* * * * *